Figure 4:
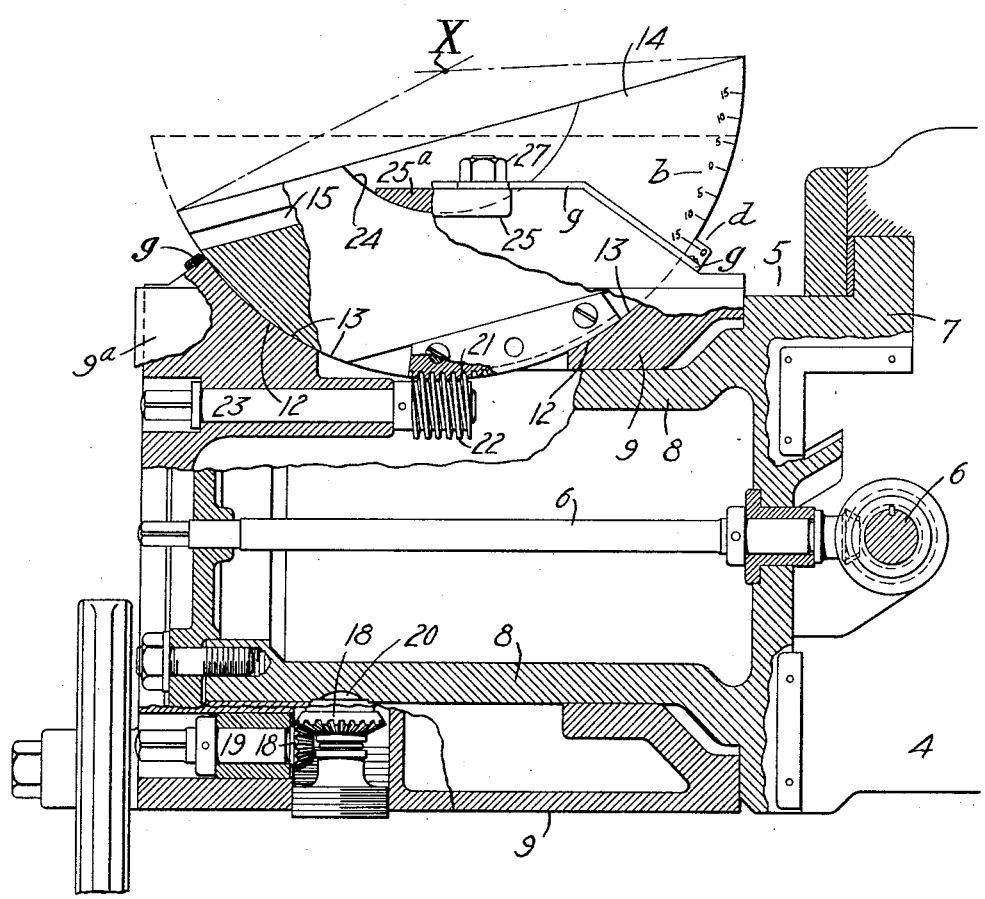

Oct. 25, 1932.          W. F. ZIMMERMANN          1,884,492
                    TIP-TOP TABLE FOR SHAPERS
                    Filed June 19, 1931     3 Sheets-Sheet 1
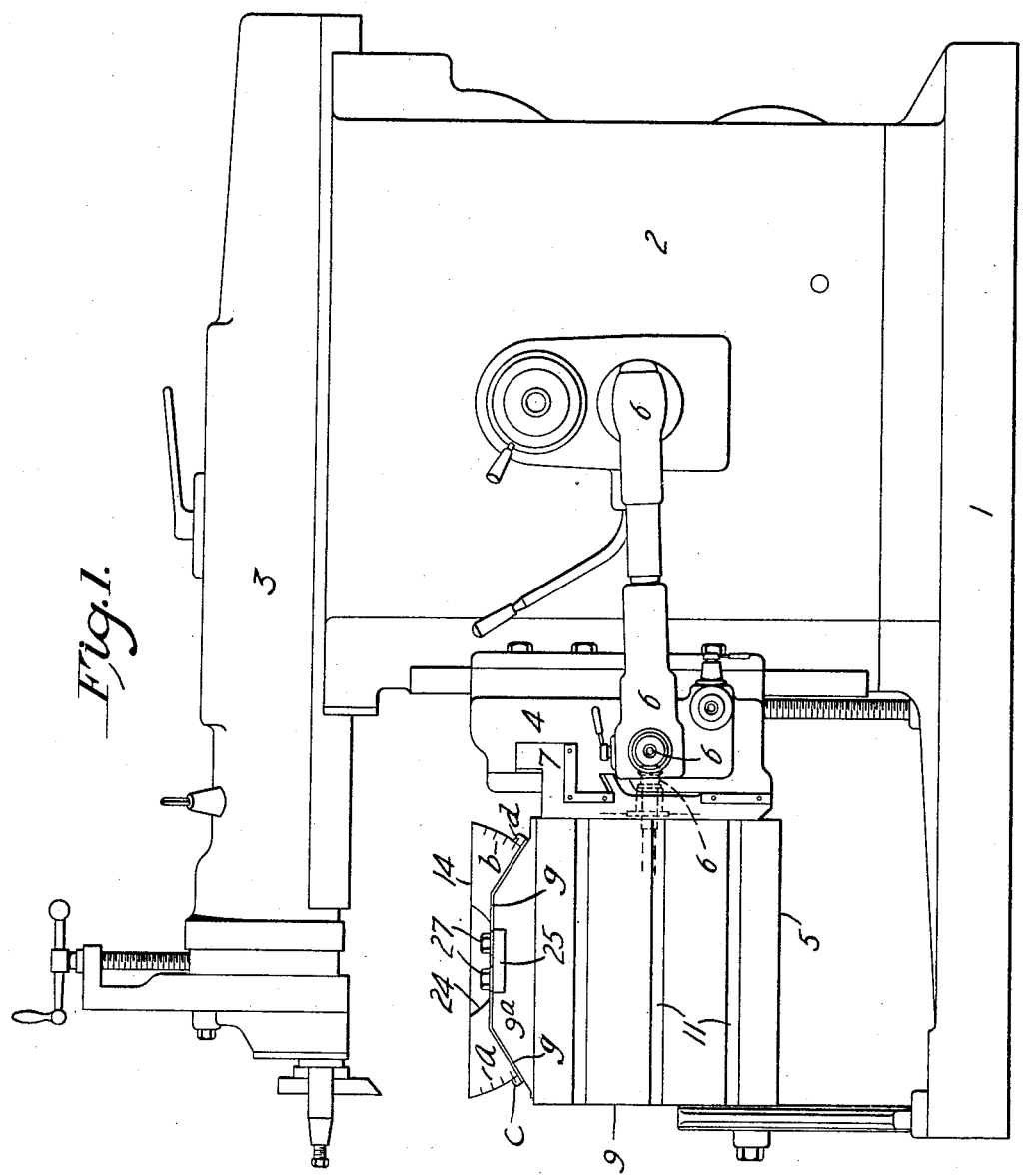
Inventor
William F. Zimmermann
By Attorneys
Nathan, Bowman + Helfrich

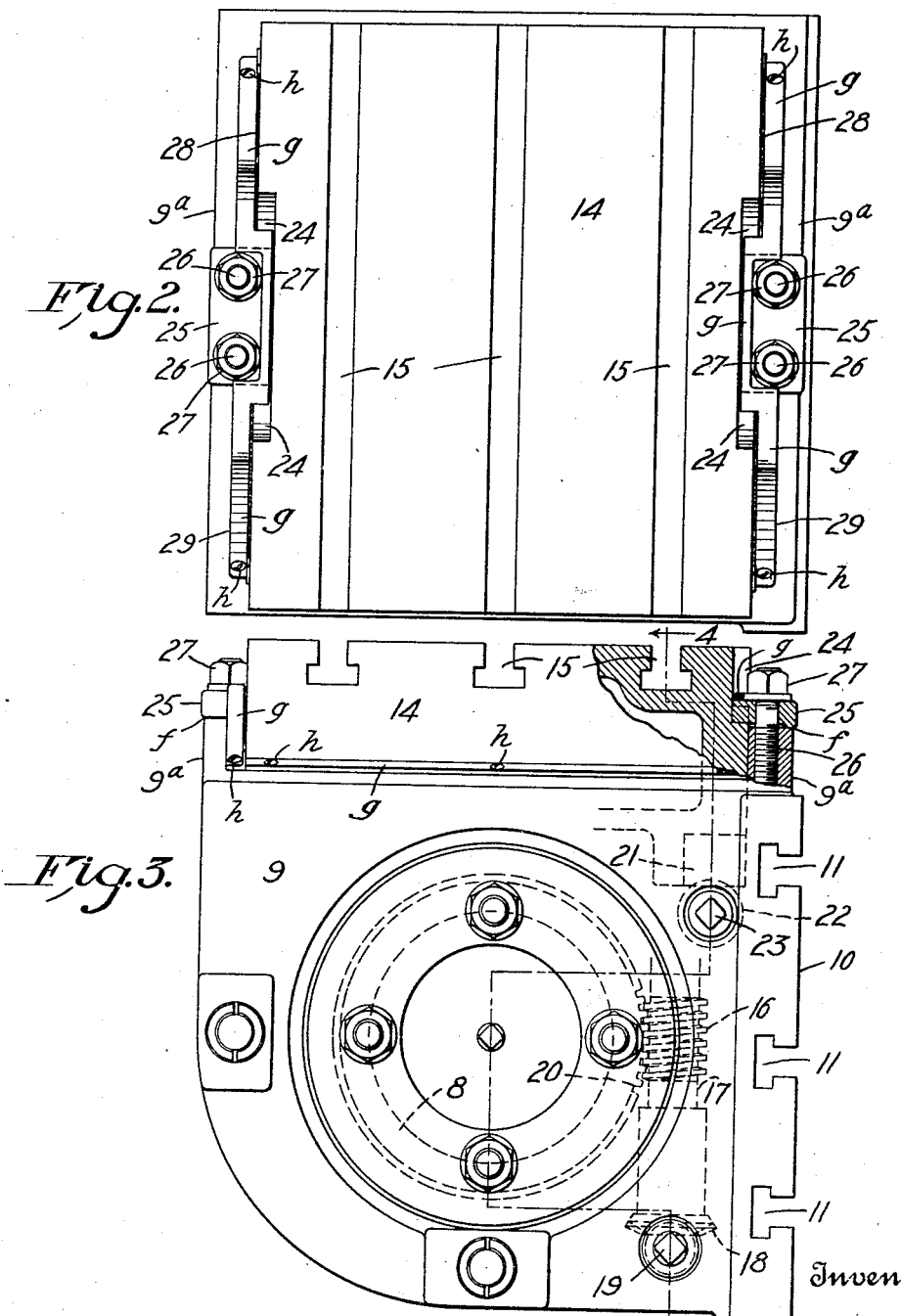

Oct. 25, 1932.  W. F. ZIMMERMANN  1,884,492
TIP-TOP TABLE FOR SHAPERS
Filed June 19, 1931  3 Sheets-Sheet 3

Inventor
William F. Zimmermann
By Attorneys
Nathan, Bowman & Helfrich

Patented Oct. 25, 1932

1,884,492

UNITED STATES PATENT OFFICE

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY

TIP-TOP TABLE FOR SHAPERS

Application filed June 19, 1931. Serial No. 545,471.

This invention relates to work-supports for machine tools and it pertains more particularly to that type of work-support, commonly provided for shaping machines, including a table-top adapted to be tilted about a horizontal axis.

Considerable difficulty has heretofore been experienced in the manufacture and use of such work-supports, partly because of difficulty in securely clamping the tiltable table-top in its various positions of adjustment, and partly because of the fact that even though the parts were accurately fitted nevertheless chips from the work-pieces being machined would find their way into the bearing and clamping surfaces thereby causing excessive wear in the parts and precluding perfect contact between said bearing and clamping surfaces.

The tiltable tops of work-supports of this nature usually are provided with undercut grooves, commonly of T-shape, for the securing thereto of the work-pieces or suitable work-holding devices. During the machining operations these grooves collect chips ranging from relatively large to relatively minute particles of metal. In the course of the machining operation, and also before effecting angular adjustment of the table-top, the operator attempts to brush the chips out of the T-slots. It has been found that by so doing he may remove the larger chips but a number of the smaller particles frequently remain in the grooves.

As such tables were heretofore constructed, when the tiltable top was in its extreme angular position the outer ends of the T-slots were within the cavity in the table base which affords the bearing for said tiltable top. This resulted in the dumping of metallic chips into the bearing and clamping surfaces, thereby producing the adverse conditions hereinbefore mentioned.

This invention has, as one of its objects, to provide a work-support of the tiltable table type, in which the cavity in the table bed affording the bearing and clamping surfaces for the tiltable top will be protected and sealed against the entrance of chips and other foreign matter. This object has been attained by so forming the tiltable table-top and its supporting bed and so positioning the axis about which the table is tilted that even in the extreme position of angular adjustment of the table the T-slots are maintained wholly outside the cavity in the table bed in which the tiltable top moves. This effectively precludes the dumping of chips into the bearing and clamping surfaces.

As a further safeguard, this invention proposes a seal, in the nature of a chip-guard, completely surrounding the cavity in the bed into which the table fits. This guard is preferably carried by the table bed and engages the surfaces of the table-top where it emerges from said cavity, thereby forming an effective seal for said cavity to exclude chips, dirt, etc.

Another object of this invention is to provide improved means for clamping the table-top in its adjusted positions. To that end, the bed portion of the table is formed with an arcuate concave seat to which is fitted a convex portion of the tiltable top. This seat forms a support in which the table-top oscillates and to which it is clamped by improved clamp means. At opposite sides of the table-top it is formed with an arcuate surface coaxial with said seat. Clamp elements, fulcrumed on the table bed, have portions fitted to said surfaces and screw devices passing through the clamp elements serve to move them vertically into contact with said surfaces thereby to force the convex portion of the table-top into clamping contact with its concave seat. This forms a very rigid and secure metal-to-metal clamp without effecting distortion of the parts.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 5:

Figure 1 is a side elevation of a shaping machine embodying the present invention. Fig. 2 is a plan view of the improved work-support, shown in Fig. 1. Fig. 3 is an end view, partly in section, of Fig. 2, and Fig. 4 is a vertical sectional view, substantially on the irregular line 4—4 of Fig. 3. Fig. 5 is an enlarged cross-sectional view of the chip-guard.

Referring more specifically to the drawings, the invention is disclosed as embodied in a shaping machine comprising a base 1, main frame 2, reciprocable ram 3, cross-rail 4 and work-support 5 horizontally movable on the cross-rail.

Feed mechanism, designated generally as 6, is provided for moving, by power or by hand, the work-support along the cross-rail.

This invention is well adapted to that type of work-support which comprises a saddle 7 fitted to the cross-rail and providing a horizontally disposed cylindrical trunnion 8 upon which is mounted, for angular adjustment, a table bed 9. The bed 9 preferably carries, at one side, a work-plate 10, formed with T-slots 11 to which work-pieces or suitable work-holders may be secured by means of bolts having their heads fitted into the T-slots. At its upper side, the bed is formed, intermediate upstanding side walls $9^a$, with a cavity, the wall of which forms an arcuate concave seat 12, the axis of which extends horizontally and is arranged substantially perpendicular to the axis of the trunnion 8. Fitted to the seat 12 is a depending convex portion 13 of a tiltable table-top 14 provided with T-slots 15 similar to and for the same purposes as the slots 11.

For purposes later to be explained the segmental seat 12 and the complemental portion 13 of the tiltable table-top are formed about an axis located substantially above the bed or approximately at the point indicated by X in Fig. 4.

Means is provided for adjusting the bed 9 angularly about the trunnion 8 to vary the positions of the work plate 10 and tiltable top 14 relative to vertical and horizontal planes respectively. This means conveniently may comprise a worm 16 carried by a vertically arranged shaft 17 journaled in the bed 9 and adapted to be rotated, through bevel gears 18, from a shaft 19, having a squared end for the reception of a suitable hand crank. The worm 16 meshes with the teeth of a worm wheel 20 formed on the non-rotatable arbor 8.

The table-top 14 is adapted to be oscillated in its seat 12, about the axis X, to cause the top to be inclined toward or away from the outer end of the bed. For this purpose, that portion of the table-top extending into the cavity in the table bed is provided with a segmental gear 21, engaged by the teeth of a worm 22, secured upon a manually rotatable shaft 23, journaled in the bed 9. The table-top is adapted to be tipped in either direction from the horizontal any desired amount up to fifteen degrees, the amount of inclination being indicated by indexes $a$ and $b$ at opposite ends of the table, which indexes cooperate with indicator markings $c$ and $d$, respectively, supported by the bed. In Fig. 4 the table-top is shown in full lines as tipped forwardly fifteen degrees, as indicated by the index $b$ and indicator $d$.

It is to be observed that in this extreme position the T-slot 15 in the table-top (see the left side of Fig. 4) is maintained above the cavity in the bed which affords the seat 12. Thus, even in this extreme position of adjustment of the table-top, any chips or particles of metal which may be in the T-slot will not be dumped into the cavity and onto the seat 12 as has been possible in prior constructions. This important improvement has been made possible by arranging the axis of the concave seat 12 and the complemental convex portion 13 well above the bed and the top of the table, at the point X hereinbefore referred to.

This invention also provides improved means, now to be described, securely to clamp the table-top in all of its positions of adjustment. At opposite sides, adjacent the upstanding side-walls $9^a$ of the bed, the table-top is formed with arcuate clamp surfaces 24, the axis of which is coaxial with the axis X of the seat 12. Cooperating with each of said clamp surfaces 24 is a clamp block 25, each having its outward end fulcrumed at $f$ on one of the upstanding side-walls $9^a$ of the bed 9. The opposite end of each block is formed with a convex portion $25^a$ (see Fig. 4) which is fitted to the concave clamp surface 24. Screw means, preferably in the form of screw studs 26, threaded into the upstanding walls $9^a$, and nuts 27 threaded thereon serve to move the blocks vertically downward about their fulcrums to cause their ends $25^a$ to bear upon the clamp surfaces 24. This tends to force the table-top downwardly which movement is resisted by the seat 12 acting upon the complemental portion 13. Thus the table-top is securely clamped in any position of adjustment. It is to be noted that actuation of the clamps effect a metal-to-metal clamping of the table without resulting in distortion of any of the parts.

In addition to the above described means for precluding the dumping of chips and other particles of metal into the table supporting and clamping seat 12, this invention also proposes additional means for excluding such foreign matter from the table receiving cavity in the bed 9, and consequently from seat 12. To that end, a chip-guard designated generally as *g* is carried by the table bed and completely surrounds the cavity therein. This chip-guard, as shown in Fig. 5 preferably comprises a felt or other fibrous member 28 underlying and projecting from a sheet metal retainer 29, both being secured to the bed, as by screws *h*. The projecting portion of the member 28 wipes upon the periphery of the convex portion of the table-top, where it emerges from the cavity in the bed. The chip-guard also extends upwardly and over the upstanding walls 9ª of the table bed and overlies the clamp blocks 25. Portions of the fibrous member 28 which project laterally from that portion of the guard overlying the walls 9ª and clamp blocks contact with the vertically disposed side-walls of the tiltable table-top 14 and thereby also prevent entrance of chips into said cavity.

From the foregoing it will be perceived that this invention has provided improved supporting and clamping means for work tables and also improved means for maintaining the table supporting and clamping seat free of metal particles which in prior constructions have caused excessive wear and precluded accurate positioning and clamping of the tiltable table-top.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof by Letters Patent of the United States:—

1. A work-support for shaping machines comprising a bed formed in its upper side with an arcuate seat; a table-top having a depending arcuate portion complemental to said seat and oscillatable thereon, said table-top also being provided with an arcuate clamp surface co-axial with said seat; a clamp-block having one portion seated upon said bed and another portion in contact with said clamp surface; and a screw device passing through said clamp-block and threaded into said bed to cause said block to be depressed into clamping contact with said clamp surface.

2. A work-support for shaping machines comprising a bed formed with upstanding side walls and intermediate said side walls with an arcuate seat the axis of which is arranged in a horizontal plane; a table-top having a depending arcuate portion complemental to said seat and oscillatable thereon, said table-top also being provided in its opposite sides with arcuate clamp surfaces co-axial with said seat; a clamp-block fitted to each of said clamp surfaces, said clamp-blocks each having a portion fulcrumed on one of said upstanding side walls of said bed; and means to move each of said clamp-blocks about its fulcrum against its complemental clamp surface thereby to cause said table-top to be clamped between said blocks and said arcuate seat.

3. A work-support for shaping machines comprising a bed provided with upstanding sidewalls and formed in its upper side with a cavity, a wall of which affords an arcuate seat the axis of which is arranged in a horizontal plane; a table-top having a portion extending into said cavity, said portion having a surface complemental to said seat and oscillatable thereon, said table-top also being provided in its opposite sides with arcuate clamp surfaces coaxial with said seat; a clamp-block fitted to each of said clamp surfaces, said clamp-blocks each having a portion fulcrumed on one of the upstanding side walls of said bed; means to move each of said clamp-blocks about its fulcrum against one of said clamp surfaces thereby to cause said table-top to be clamped between said blocks and said arcuate seat; and a fibrous chip-guard carried by said bed and extending wholly about said cavity and over said clamp-blocks, said guard engaging the surfaces of said table where it emerges from said cavity, thereby to seal said cavity against the entrance of chips.

4. A work-support for shaping machines comprising a bed formed in its upper side with a cavity affording an arcuate seat and vertically disposed sidewalls; a work-table having a depending arcuate portion complemental to said seat and vertically disposed sidewalls arranged between and in contact with the vertically disposed sidewalls of said bed, the sidewalls of said table being provided in their outer faces with segmental cavities extending only partially through the sidewalls and affording horizontally arranged clamping surfaces; vertically adjustable clamp-blocks having one portion engaging said bed and another portion fitted to said clamping surfaces; and means for forcing said clamp-blocks into clamping engagement with said clamp surfaces.

In witness whereof, I have hereunto subscribed my name.

WILLIAM F. ZIMMERMANN.